(12) United States Patent
Anchala et al.

(10) Patent No.: US 11,914,063 B2
(45) Date of Patent: Feb. 27, 2024

(54) AUTOMATED BORDER COORDINATION FOR RADIOFREQUENCY NETWORK SECTORS

(71) Applicant: DISH Wireless L.L.C., Englewood, CO (US)

(72) Inventors: Aravind Anchala, Reston, VA (US); Dilip Tandekar, Broadlands, VA (US); Gurpreet Sohi, Parker, CO (US); Sourabh Gupta, Ashburn, VA (US); Neil Nocete, Fairfax, VA (US)

(73) Assignee: DISH Wireless L.L.C., Littleton, CO (US)

(*) Notice: Subject to any disclaimer, the term of this patent is extended or adjusted under 35 U.S.C. 154(b) by 239 days.

(21) Appl. No.: 17/557,765

(22) Filed: Dec. 21, 2021

(65) Prior Publication Data
US 2023/0194651 A1 Jun. 22, 2023

(51) Int. Cl.
*G01S 5/02* (2010.01)
*H04B 17/391* (2015.01)
*H04W 16/14* (2009.01)
*H04W 16/18* (2009.01)
*H04W 64/00* (2009.01)

(52) U.S. Cl.
CPC ........ *G01S 5/02524* (2020.05); *H04B 17/391* (2015.01); *H04W 16/14* (2013.01); *H04W 16/18* (2013.01); *H04W 64/003* (2013.01)

(58) Field of Classification Search
CPC ... G01S 5/02524; G01S 11/06; H04B 17/391; H04B 17/318; H04W 16/14; H04W 16/18; H04W 64/003
See application file for complete search history.

(56) References Cited

U.S. PATENT DOCUMENTS

| | | | | |
|---|---|---|---|---|
| 2003/0086405 | A1* | 5/2003 | Silva | H04W 52/343 370/335 |
| 2005/0090217 | A1* | 4/2005 | Zhu | H04W 16/18 455/242.1 |

* cited by examiner

*Primary Examiner* — Fred A Casca
(74) *Attorney, Agent, or Firm* — Kilpatrick Townsend & Stockton LLP

(57) ABSTRACT

Systems and methods are described for automated detection of border conflicts in physical radiofrequency (RF) communication network infrastructures. For example, proposed sector antennas in a greenfield physical network deployment may be licensed to radiate in certain spectrum blocks in the mapped licensed geographic regions (mLGR) where they are located, but the licenses may not permit radiated power in those spectrum blocks to cross into adjacent mLGRs. Embodiments compute radiation contours for the sector antennas indicating estimated local power levels computed based on antenna characteristics of the sector antennas and propagation model data that defines geographic morphologies for the mLGRs. The radiation contours are analyzed to detect any border conflict conditions where the estimated local power levels exceed defined threshold radiation levels in unlicensed regions. A culprit set of the sector antennas can be output to indicate those responsible for detected border conflict conditions.

20 Claims, 7 Drawing Sheets

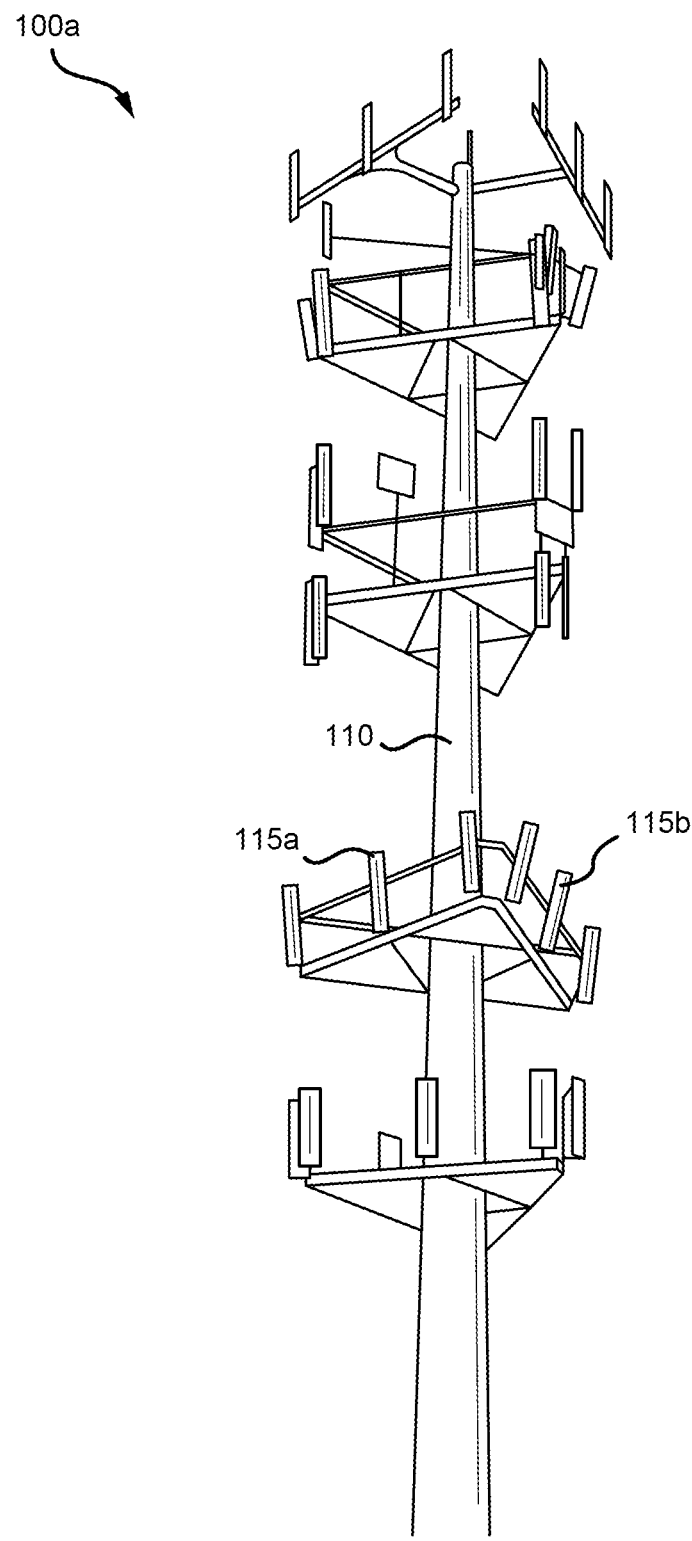
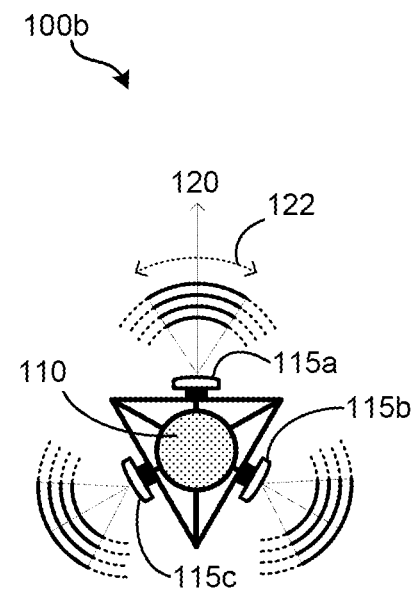
FIG. 1B
FIG. 1A

AUTOMATED BORDER COORDINATION FOR RADIOFREQUENCY NETWORK SECTORS

CROSS-REFERENCE TO RELATED APPLICATIONS

This application is related to U.S. patent application Ser. No. 17/546,297, entitled "AUTOMATED SECTOR CREATION IN PHYSICAL RADIOFREQUENCY NETWORK DEPLOYMENTS," filed on Dec. 9, 2021, the disclosure of which is hereby incorporated in its entirety for all purposes.

FIELD

Embodiments relate in general to physical communication network infrastructures, and, more particularly, to automated border coordination for antenna sectors in physical infrastructures of radiofrequency networks.

BACKGROUND

As telecommunications technologies continue to develop and new related markets continue to emerge, new and old network operators are constantly looking for ways to provide new (e.g., upgraded, expanded, etc.) network service offerings to consumers. In such contexts, network operators can generally be categorized as either "brownfield" or "greenfield" operators. A brownfield network operator typically offers new network services using an existing network infrastructure with legacy components, such as by upgrading or expanding legacy capabilities. In contrast, a greenfield operator typically offers new network services by deploying (e.g., and installing, configuring, etc.) entirely new network infrastructure, at least in relation to the new network service offerings. A same network operator can be both a brownfield and a greenfield operator in different contexts. For example, a network operator can already have an established subscriber base on a legacy network using a first radio technology, and can offer new services as a brownfield operator in that context. The same network provider can then obtain a new swath of spectrum, for which it can develop entirely new network infrastructure, new service offerings, and new subscribers as a greenfield operator.

Developing a new network as a greenfield network operator can involve developing new physical network infrastructure. The greenfield operator may be granted one or more licenses (e.g., by virtue of a spectrum auction conducted by the Federal Communications Commission) to provide services over one or more bands or sub-bands of spectrum in particular geographical regions. Thus, greenfield operators can seek to maximize the license value by designing their new physical infrastructure to maximize network coverage to a maximum number of potential new subscribers within the scope of their licenses. For cellular networks, designing the physical infrastructure includes determining how many physical antennas to deploy in which physical locations to ensure that the resulting radio access network (RAN) will provide the desired coverage and/or other features.

SUMMARY

Embodiments of the present invention relate to automated detection of border conflicts in physical radiofrequency (RF) communication network infrastructures. For example, a network operator is granted licenses to use multiple spectrum blocks in multiple mapped licensed geographic regions (mLGRs) for which the network operator does not currently have physical infrastructure. An RF network design deploys (or proposes for deployment) a number of sector antennas located at sector site locations to meet a link budget over a target coverage area by using each sector antenna to radiate power in a spectrum block that is licensed for use in the mLGR where the sector antenna is located (the home mLGR for the sector antenna). However, while each sector antenna is permitted to use a particular spectrum block in its home mLGR, it may not be permitted to radiate power in that spectrum block beyond the borders of its home mLGR. Embodiments compute radiation contours for the sector antennas indicating estimated local power levels computed based on antenna characteristics of the sector antennas and propagation model data that defines geographic morphologies for the mLGRs. The radiation contours are analyzed to detect any border conflict conditions where the estimated local power levels exceed a threshold radiation level permitted to propagate from the plurality of sector antennas into unlicensed mLGRs pursuant to granted spectrum licenses and/or other conditions. A culprit set of the sector antennas can be output to indicate those sector antennas responsible for detected border conflict conditions.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIGS. 1A and 1B show an example physical deployment site for sector antennas of a radiofrequency (RF) network;

Figure 2:
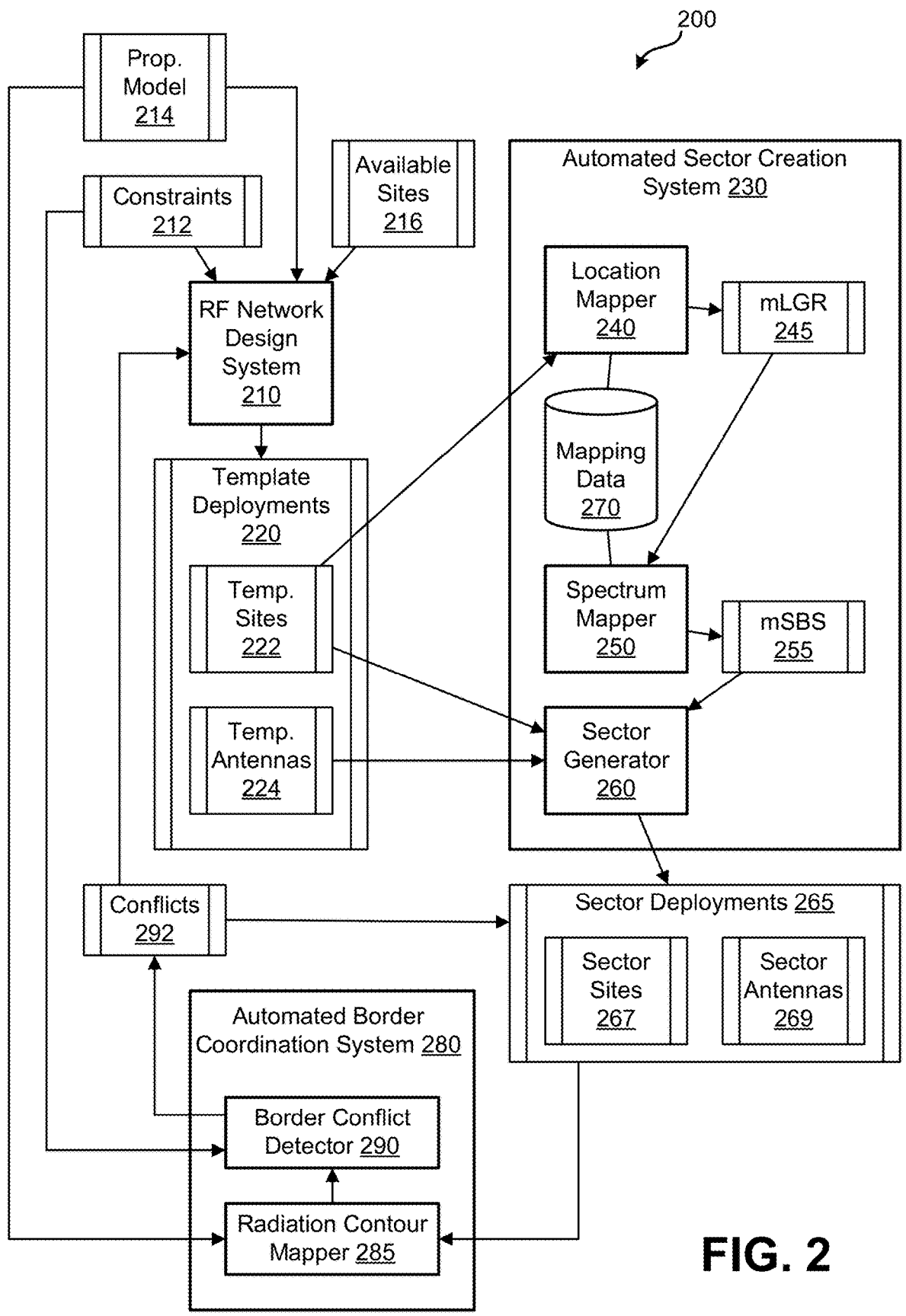
FIG. 2 shows a block diagram of an illustrative RF network design environment in which a greenfield network operator can implement automated sector creation, according to various embodiments described herein.

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Developing a new network as a greenfield network operator can involve developing new physical network infrastructure. The greenfield operator may be granted one or more licenses to provide services over one or more bands or sub-bands of spectrum in particular geographical regions. In seeking to maximize the value of the license grants, greenfield network operators can design their new physical infrastructure to maximize network coverage to a maximum number of potential new subscribers within the scope of their licenses. For cellular networks, designing the physical infrastructure includes determining how many physical antennas to deploy in which physical locations to ensure that the resulting radio access network (RAN) will provide the desired coverage and/or other features.

The physical antenna placements involve locating sites with physical structures on which to place the antennas, and configuring a respective set of sector antennas to deploy at each of those sites. For the sake of context, FIGS. 1A and 1B show an example physical deployment site 100 for sector antennas of a radiofrequency (RF) network. As illustrated in FIG. 1A, the site includes a support structure 110 to support multiple sector antennas 115. The support structure 110 is illustrated as a tall pole. In some instances, the support structure 110 is implemented as other types of dedicated, self-supporting structures. In other instances, the support structure 110 is attached to another self-supporting structure, such as a building, water tower, or the like. The support structures 110 of the antenna and radio unit can include any suitable structures that are tall enough to provide desired vertical sector antenna 115 placement, strong and stable enough to support the sector antennas 115 (e.g., including in wind and other weather conditions), etc. The particular support structure 110 shown in FIG. 1A is supporting multiple sector antennas 115 at multiple vertical and radial locations.

Each sector antenna 115 is a radiofrequency (e.g., microwave) antenna having a directional, sector-shaped radiation pattern. Typically, each sector antenna 115 is configured to produce relatively wide horizontal beamwidth and a relatively narrow vertical beamwidth. In this way, the radiation can effectively fan out to cover a large horizontal area, while avoiding interfering with antennas above and below on a same support structure 110. For example, the radiation beam may spread over a horizontal arc of 60-120 degrees, while the vertical beamwidth may only be less than 15 degrees. As can be seen in FIG. 1A, the sector antennas 115 may, in some cases, be tilted downward (e.g., manually, electromechanically, by phase shifting, etc.). Such downward tilting can help constrain the projected radiation pattern of the sector antenna 115 to within a desired boundary to avoid interference.

As illustrated in FIG. 1B, many modern cellular RAN infrastructures use a three-sector deployment (sometimes referred to as a three-sector antenna, a three-sector base station, or the like) at each site (e.g., on each support structure 110). Each sector antenna 115 can be said to be radially pointing in a direction of a primary radiation axis 120, and its radiation generally fans out horizontally to provide the horizontal coverage. Thus, as used herein, creating or computing a "sector" can generally refer to creating or computing a particular horizontal arc (e.g., 120 degrees) of radiation in a particular frequency range; the arc originated at a particular site location and has a centerline that generally points along a primary radiation axis 120. The computed sector can be physically implemented by locating a sector antenna 115 at the site location, pointing it at an azimuth corresponding to or at an inclination angle to the primary radiation axis 120, and configured it to radiate the particular frequency range in substantially the manner of the corresponding sector.

In the illustrated three-sector antenna deployment, the three sector antennas 115 are pointed for potential maximum coverage, such as at zero degrees, 120 degrees, and 240 degrees. The illustrated sector antennas 115 are shown as having a horizontal beamwidth 122 of approximately 66 degrees. The beamwidth is the angle between the points at which the signal strength is decreased by around 3 decibels (approximately half the signal strength) on either side of a peak signal strength. For example, the illustrated 66-degree horizontal beamwidth 122 indicates a relatively high signal strength within a range of plus or minus 33 degrees from the primary radiation axis 120, and less than half the signal strength outside that arc. The signal strength may continue to fall beyond the beamwidth, until it reaches a relatively negligible level outside some larger arc, such as at more than plus or minus 60 degrees from the primary radiation axis 120. For example, the radiation patterns are represented in FIG. 1B as thicker arcs within a 66-degree beamwidth 122 and as dashed arcs outside the beamwidth 122 and within a larger 120-degree arc. With the sector antennas 115 each radiating over approximately 120 degrees and each radially separated from its neighboring sector antenna 115 by 120 degrees, the three-sector deployment can provide a substantially 360-degree radiation pattern (though not with evenly distributed power across all 360 degrees).

For the sake of clarity herein, descriptions will refer to "sector deployments." Each sector deployment includes a set of sector antennas 115 all co-assigned to a same site (typically at a same height) to transmit on one or more spectrum blocks under a same license (e.g., a same spectrum block, a contiguous set of spectrum blocks, or a non-contiguous set of spectrum blocks). Each sector antenna 115 in a same sector deployment can have its own respective azimuth (i.e., radial pointing direction). Typically, each sector deployment has three sector antennas 115 pointed in different directions (e.g., to cover 360 degrees). However, some sector deployments can have more or fewer sector antennas 115 to provide a desired radiation profile, to avoid certain interference, etc. Each sector antenna 115 in a same sector deployment can have other characteristics that are the same as, or different from those of the other sector antennas 115 in its sector deployment, such as the same or different radiation pattern, downtilt, power level, etc.

As used herein, sector antennas 115 of a sector deployment are considered "co-assigned to a same site" when commonly assigned to a same geographical location as defined according to a particular latitude and longitude, a particular support structure 110, etc. Sector antennas 115 installed on multiple support structures 110 can be considered as being co-assigned to a same site, even though the support structures 110 may technically be separate structures (e.g., multiple brackets attached to a same large water tower), as long as the structures are intended as (e.g., leased as) a single site. As used herein, sector antennas 115 of a sector deployment are considered "co-assigned to a same site" when they are at a same vertical location, as defined by a vertically positioned sub-structure on a support structure 110, by an altitude relative to sea level, by a vertical distance relative to the ground, etc. Sector antennas 115 in a same sector deployment can still be considered as being "co-assigned to a same height," even though the heights may slightly differ due to manufacturing or installation tolerances, structural limitations, etc.

As used herein, sector antennas 115 of a sector deployment are considered "co-assigned to a same spectrum block" when they are all deployed to transmit on a same particular frequency band division as defined by an associated spectrum license. For example, a recent spectrum auction performed by the Federal Communications Commission (FCC) allowed parties to bid on 280 Megahertz (MHz) of total spectrum in the 3.7-3.98 Gigahertz (GHz) frequency band. A total of 5,684 licenses were auctioned, each for one of 14 "spectrum blocks" (each representing a 20 MHz portion of the 280 MHz) in each of 406 defined geographic regions. In some cases, such auctions also use the term "block" to refer to a larger spectrum division, and the term "sub-block" is used for the smaller spectrum subdivisions. For example, the referenced auction was listed as having an "A-block" with five of the sub-blocks (between 3.7-3.8 GHz), a "B-block" with another five of the sub-blocks (between 3.8-3.9 GHz), and a "C-block" with the remaining four of the sub-blocks (3.9-3.98 GHz). As used herein, the term "spectrum block" intends to refer to the licensed spectrum sub-band in a sector antenna 115 would be configured to radiate, not to the auction subdivisions (e.g., to the 20 MHz spectrum blocks in the example FCC auction).

As noted above, each spectrum license typically allows particular use of a licensed spectrum block within a licensed geographic region. A same network operator licensee may typically be granted multiple licenses (e.g., as part of a same auction), which together allow particular use of a licensed spectrum block within multiple licensed geographic regions, particular use of multiple licensed spectrum blocks within one licensed geographic regions, or particular use of multiple licensed spectrum blocks within multiple licensed geographic regions. For example, a nationwide carrier seeking to build out a new cellular network in a new frequency band may be granted hundreds or thousands of licenses in one or more auctions, permitting the nationwide carrier to offer services in one or more licensed spectrum blocks in each of hundreds or thousands of licensed geographic regions.

FIGS. 1A and 1B illustrate a single support structure 110, which may represent a single site for one or more sector deployments (e.g., at one or more associated heights). Each sector deployment can provide an associated coverage area, which corresponds to a union of all the projected radiation patterns from the sector antennas 115 of the sector deployment. For example, subscribers located within the coverage area of the sector deployment can be serviced by the network operator that operates that sector deployment. To cover a very large geographical region may involve operating very large numbers of such sector deployments located in very large numbers of sites. For example, each individual coverage area may have a radius of only a few miles, and a network operator may deploy hundreds, thousands, or more sector deployments across geographically distributed sites to provide coverage over large portions of a country or region.

For a greenfield network operator, establishing new physical network infrastructure can involve designing a RAN to provide optimal coverage and capacity to maximize the value of their license grants. Thus, for each licensed spectrum block in each licensed geographic region, designing the RF plan involves defining set of sector deployments that will produce desired coverage characteristics. Defining the set of sector deployments for each licensed spectrum block in each licensed geographic region involves a number of complex considerations, such as considering in which parts of the licensed geographic region to provide coverage at which power levels, considering whether those desired coverage areas have geographic features (e.g., terrain) that may impact propagation of radiation in the licensed spectrum block, considering physical locations of available sites in the licensed geographic region (e.g., those having space for additional sector deployments, available for leasing, etc.), etc. Particularly for a greenfield operator obtaining hundreds of license grants, building out a supporting physical network infrastructure can involve analyzing such considerations for defining many thousands of sector deployments.

FIG. 2 shows a block diagram of an illustrative radiofrequency (RF) network design environment 200 in which a greenfield network operator can implement automated sector creation and automated border coordination, according to various embodiments described herein. As illustrated, the environment 200 can include a RF network design system 210, an automated sector creation system 230, and an automated border coordination system 280. In some embodiments, the automated sector creation system 230 and/or the automated border coordination system 280 are implemented as part of the RF network design system 210. In general, the RF network design system 210 is used to generate a set of template deployments 220, which essentially make up an RF network design that satisfies a link budget for providing RF network coverage to subscribers in a target coverage area. The template deployments 220 define template antennas 224 (with corresponding antenna characteristics) to be deployed at particular template sites 222 throughout the target coverage area. Embodiments of the automated sector creation system 230 generally use those template deployments 220, along with mapping data 270 relating to licensed geographic regions and licensed spectrum blocks, to compute sector deployments 265. The sector deployments 265 define the locations and characteristics of all the sector antennas to be deployed by a greenfield network operator as new physical RAN infrastructure for providing subscriber coverage across the target coverage area.

Figure 3A:
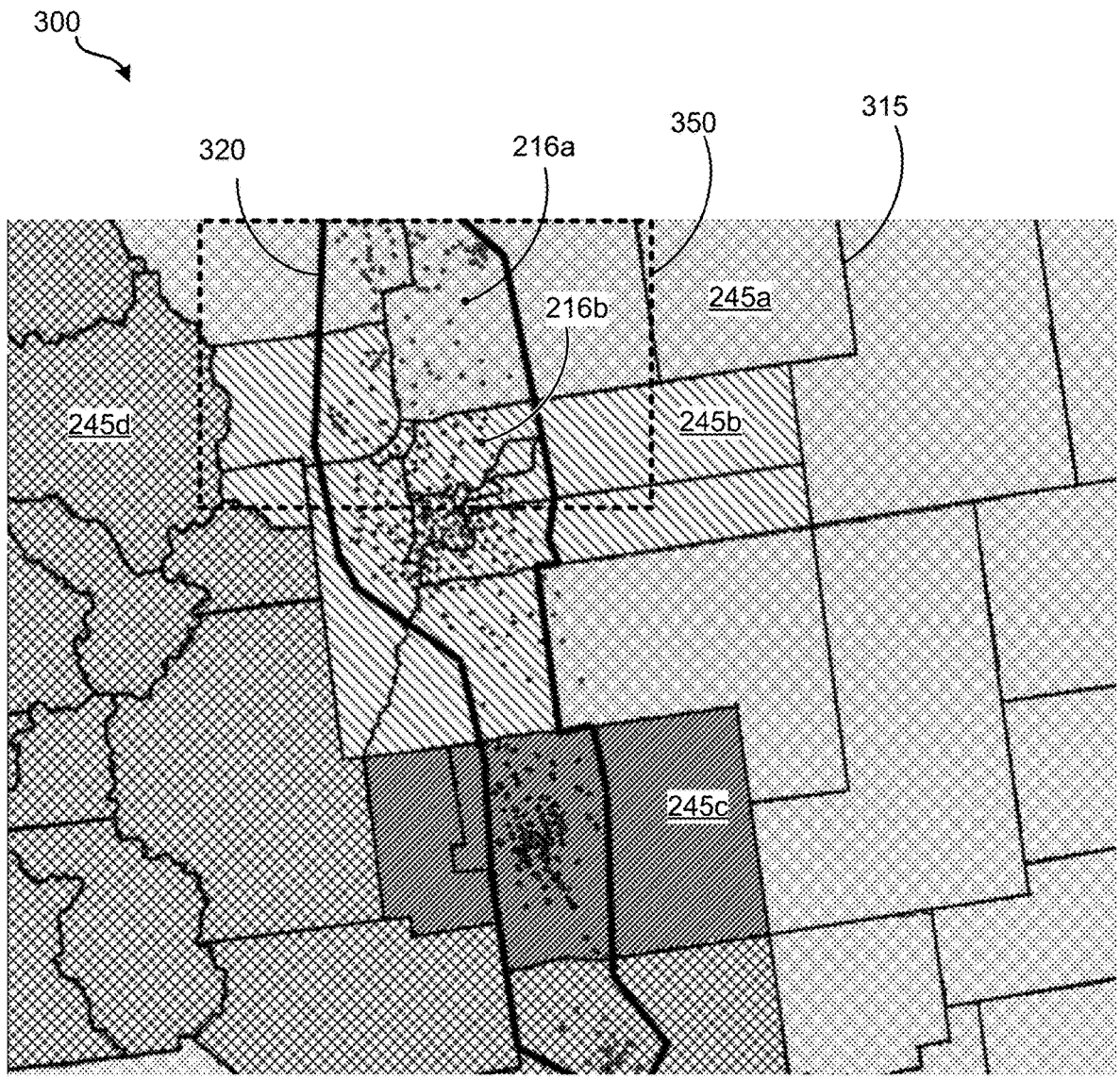
FIG. 3A shows an illustrative geographic context for a greenfield physical network deployment.
Figure 3B:
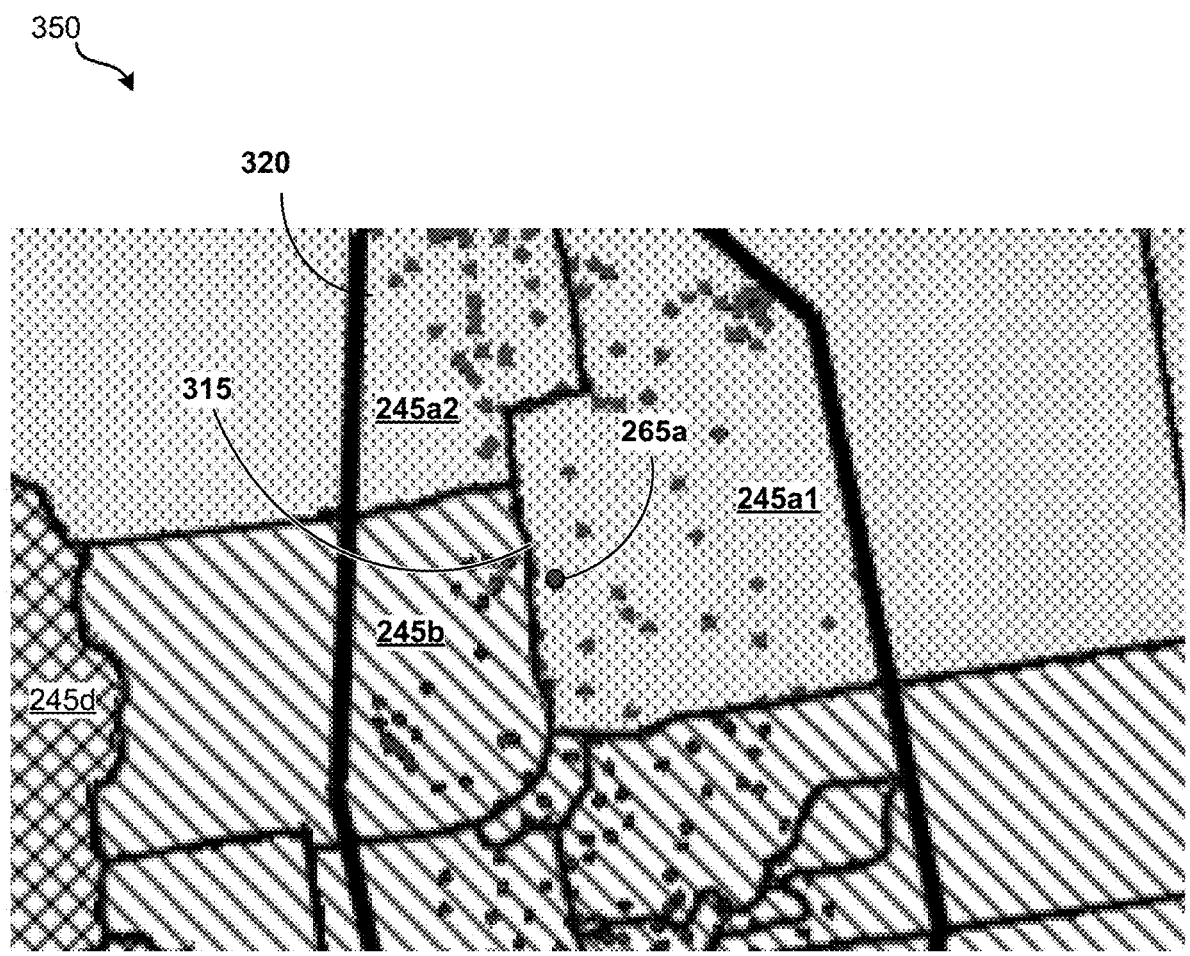
FIG. 3B shows a zoomed-in region of the geographic context of FIG. 3A.

For the sake of added context, the description of FIG. 2 will continue along with reference to FIGS. 3A and 3B. FIG. 3A shows an illustrative geographic context 300 for a greenfield physical network deployment. The illustrative geographic context 300 assumes that the greenfield network operator is seeking to provide coverage to customers within a target coverage area 320 (identified by a dark boundary). To provide such coverage, the greenfield network operator can build out a new physical network infrastructure, including designing a radiofrequency (RF) network (e.g., a RAN) to have desired radiation characteristics over the target coverage area 320. It is assumed that the greenfield network operator has been granted various spectrum licenses, such that the greenfield network operator is permitted to use a set of one or more licensed spectrum blocks in each of multiple licensed geographic regions that overlap with the target coverage area 320 in order to implement the designed RF network.

During an initial RF network design phase, the greenfield network operator can determine all available sites 216 (i.e., cell sites) in the target coverage area 320. Within the target coverage area 320, all available sites 216 are shown as dots, each representing one or more collocated physical support structures on which a sector deployment can be installed, as described above. For example, the greenfield network operator can contact multiple site (e.g., cell tower) vendors in the region to obtain a list of all available sites 216 in the target coverage area 320. Each available site 216 can be associated with a respective physical site location (e.g., defined by latitude and longitude, or in any other suitable manner). In some cases, some or all available sites 216 can be associated with additional information, where available and/or relevant, such as one or more available antenna heights at which a sector deployment at that site could be installed, available types of support structures (e.g., whether an associated structure supports certain amounts of downtilt), nearby physical obstructions, etc.

As illustrated in FIG. 2, the set of available sites 216 can be an input to the RF network design system 210. In some embodiments, the RF network design system 210 is implemented as a computational tool to assist RF network designers with generating a detailed RF network design. The RF network design can seek to ensure that receivers (e.g., subscriber devices) across the target coverage area 320 will see at least a minimum signal quality (e.g., quality of service, signal to noise ratio, etc.) when accounting for all gains and losses impacting radiation to and from all the sector antennas that are part of the RF network design. Such a target can be expressed as one or more link budgets across the target coverage area 320. For example, in a cellular network, the link budget can be the amount of power received by a receiver at any particular location computed as a function of transmitting output power of one or more sector antennas impacting that location, plus any gains (e.g., transmitting and/or receiving antenna gains), minus any losses (e.g., transmitting and/or receiving antenna losses, connector and/or other component losses, free space path and/or other path losses, fading margin and/or other attenuations, etc.), plus any added margins (e.g., to account for random variations in channel gain, weather, etc.). In effect, meeting the link budget in a particular location suggests that subscribers in that location will be able to receive at least a certain quality of telecommunication services (e.g., with at least a desired minimum signal-to-noise ratio).

As illustrated, in addition to the set of available sites 216, the RF network design system 210 can take as inputs a set of constraint data 212 and a set of propagation model data 214. The set of constraint data 212 can include at least the link budget. In some cases, the set of constraint data 212 can also include information, such as power constraints associated with the granted spectrum licenses, a template RF frequency (described below), etc. The set of propagation model data 214 can include information about features of the target coverage area 320 that may impact propagation of radiation in the RF network that is being designed. In some cases, regions of the target coverage area 320 can be classified according to geographic and/or other features, referred to herein as geographic morphology. For example, the geographic morphology of a particular target coverage area 320 can include regions classified as sea water, inland water, wetlands, barren land, low vegetation, coniferous forest, deciduous forest, relatively low-height low-density construction (e.g., a village), relatively low-height high-density construction (e.g., a suburban residential area), relatively high-height high-density construction (e.g., a city), a commercial center, an industrial center, an educational campus, an event venue, an airport runway, an airport terminal, etc.

Some RF network designs can account for such region classifications in the set of propagation model data 214 by applying them to one or more radiation propagation models for the target coverage area 320. For example, RF signals can have different propagation characteristics when transmitted through open space, as compared to being transmitted through a forest, a dense city, etc. Different modeled impacts of the classifications on propagation of RF signals in different regions of the target coverage area 320 can be used to guide placement and/or characteristics of transmitters (e.g., power level, azimuth, tilt, height, etc.). In some cases, RF network designs can consider variations in likely subscriber density over the target coverage area 320 based on the same, or other regional classifications. For example, subscriber density is likely to be very low (or non-existent) in a sea water region, but very high in a dense urban region. Such various in density may impact the number of cells servicing particular regions, the amount of power used to transmit there, and/or other factors of the RF network design.

It can generally be assumed that the greenfield network operator is designing the new physical network infrastructure to provide a new infrastructure-class of service offerings. As used herein, a "new infrastructure-class of service offerings" refers to use of new offerings of a network operator that involve a new radio technology, new spectrum bands, and/or any other departure from the network operator's existing infrastructure that necessitates deployment of the new physical infrastructure being designed by the RF network design. For example, a network operator may already have a large physical infrastructure to provide subscriber coverage according to "4G" radio technologies, and the same network operator now desires to offer services to subscribers according to "5G" radio technologies (e.g., 4G an 5G refer, respectively, to so-called "fourth generation" and "fifth generation" standards promulgated by standards setting organizations, such as under the umbrella of the Third Generation Partnership Project (3GPP), and to related technologies conforming to and supporting those standards). The RF network design is generated based on the associated radio technology to the extent that the particular technology impacts the propagation models, and the like. For example, each new infrastructure-class of service offerings may have its own associated types of antennas with their own associated antenna models (e.g., radiation characteristics), its own set of frequency bands (e.g., for uplink and/or downlink), its own power requirements (e.g., transmit power limitations), etc. As such, the RF network design can account for these characteristics in determining placement and/or other characteristics of antennas throughout the target coverage area 320.

Each new infrastructure-class of service offering has an associated set of RF frequencies, and the propagation and/or other characteristics of the antennas can be a function of those RF frequencies. However, the RF network design typically evaluates link budget based on a single template RF frequency that falls within the set of RF frequencies associated with the new infrastructure-class of service offering. For example, the greenfield network operator is designing for new infrastructure-class of service offerings using 5G new radio (NR) technologies. In relation to the 5G NR offerings, the greenfield network operator has been granted a large number licenses to licensed spectrum blocks in a number of different frequency bands, including in the so-called "n29" band (associated with a 700 MHz carrier) and "n71" band (associated with a 600 MHz carrier). During the RF network design phase, link budgets can be computed using any selected template RF frequency in or around these bands, such as using 700 MHz.

Based on the above, the output of the RF network design system 210 (e.g., of an initial RF network design phase) can include a set of template deployments 220 having assigned template sites 222 throughout the target coverage area 320 to meet the link budget. For each template deployment 220, the RF network design can include a set of template antennas 224, each with associated antenna characteristics to include some or all of an antenna height, antenna azimuth, antenna model, downtilt, and power level. Each template antenna 224 is essentially a logical representation of a template for a sector antenna to potentially be deployed as part of the physical network infrastructure. The logical representation can be stored and managed in any suitable manner. For example, each template antenna 224 can be associated with a logical identifier that is associated with all the various antenna characteristic data (e.g., as object data, or the like). In some cases, each template antenna 224 is also associated with the template RF frequency. For example, suppose the initial set of available sites 216 included 5,000 sites geographically distributed across the target coverage area 320. The output of the RF network design phase may be a subset of five hundred template deployments 220 at five hundred respective assigned template sites 222, each corresponding to a respective one of the 5,000 available sites 216.

Embodiments of the automated sector creation system 230 compute sector deployments 265 based on the template deployments 220 and mapping data 270 generated according to spectrum license information. As illustrated, the automated sector creation system 230 can include a location mapper 240, a spectrum mapper 250, and a sector generator 260. As noted above, it is generally assumed that the greenfield network operator is designing the new physical network infrastructure to provide a new infrastructure-class of service offerings in order to utilize spectrum blocks for which the network operator has been granted licenses under multiple geographic spectrum licenses. Thus, for each template deployment 220 in the target coverage area 320, the automated sector creation system 230 first seeks automatically to determine which spectrum blocks the network operator has been licensed to use in the particular physical location corresponding to the template site 222 of the template deployment 220. To that end, for each template deployment 220, the location mapper 240 associates the template site 222 with a mapped licensed geographic region (mLGR) 245 that is mapped to one or more geographic regions identified by the geographic spectrum licenses, and the spectrum mapper 250 determines a mapped spectrum block set (mSBS) 255 indicating which spectrum blocks are licensed to the network operator in the associated mLGR 245.

The association by the location mapper 240 between the template site 222 and the mapped licensed geographic region (mLGR) 245 can be based on mapping data 270 (e.g., maintained in a database, or any suitable data storage). Each mLGR 245 can define a geographic region at least partially encompassing one or more licensing regions of the geographic spectrum licenses. For example, RF spectrum is typically licensed by a regulatory agency (e.g., the FCC) in a manner that authorizes the licensee to communicate within the licensed spectrum block over a particular geographical region defined by the license and within particular other limits defined by the license (e.g., a defined maximum transmission power). The manner of defining a particular geographic region can change from one license to the next, even for different licenses that may impact the same spectrum blocks. For example, each FCC auction typically grants licenses to spectrum blocks based on defined "geographic licensing schemes." Such geographic licensing schemes can define geographic boundaries for a spectrum block license using any of Bureau of Economic Analysis Economic Areas (BEAs), Partial Economic Areas (PEA), Cellular Market Areas (CMA), FCC United States County equivalents, Component Economic Areas (CEA), and/or other geographic designators. As such, any particular site location (e.g., at any particular latitude and longitude) may be geographically located within multiple overlapping geographical designations impacted by multiple overlapping geographic licensing schemes.

The mLGRs 245 can be defined in any suitable manner. For example, each mLGR 245 can be defined as a set of latitude and longitude coordinates that indicate boundary lines of the mLGR. Further, the mLGR 245 definitions may or may not equate to any other geographic licensing schemes, or the like. In one implementation, each mLGR 245 corresponds to a FCC United States County equivalents. For example, a greenfield network operator is granted a set of spectrum licenses that define some licensed geographical boundaries in terms BEAs, and others in terms of PEAs; and the mapping data 270 maps the different boundaries from the different geographic licensing schemes into a normalized set of mLGRs 245 (e.g., each corresponding to a single respective FCC United States County equivalent).

In accordance with the granted spectrum licenses, the greenfield network operator is licensed to use a particular set of spectrum blocks in each mLGR 245. For example, embodiments can ensure that each mLGR 245 is defined to be smaller than geographic licensing schemes being used by the spectrum licenses, so that the set of spectrum blocks licensed to the greenfield network operator is consistent across each defined mLGR 245. For each template deployment 220, the template site 222 has been associated with a particular mLGR 245, and the particular mLGR 245 is associated (by the spectrum license grants) with a particular set of licensed spectrum blocks. Embodiments of the spectrum mapper 250 can thus associate each template site 222 with the set of licensed spectrum blocks for its associated mLGR 245, which is the one or more mSBSs 255 for the template site 222.

For the sake of illustration, suppose the greenfield network operator is granted licensed in the "n71" (600 MHz) band for 5G NR networks. The n71 band includes uplink frequencies in the range of 663-698 MHz, and downlink frequencies in the range of 617-652 MHz. The following Table illustrates some of the possible mSBSs 255 that may be available for the n71 band:

| mSBS 255 ID | Downlink Center (MHz) | Uplink Center (MHz) | Bandwidth (MHz) |
| --- | --- | --- | --- |
| A | 619.5 | 665.5 | 5 |
| B | 624.5 | 670.5 | 5 |
| C | 629.5 | 675.5 | 5 |
| D | 634.5 | 680.5 | 5 |
| E | 639.5 | 685.5 | 5 |
| F | 644.5 | 690.5 | 5 |
| G | 649.5 | 695.5 | 5 |
| A-B | 622 | 668 | 10 |

-continued

| mSBS 255 ID | Downlink Center (MHz) | Uplink Center (MHz) | Bandwidth (MHz) |
| --- | --- | --- | --- |
| C-D-E | 634.5 | 680.5 | 15 |
| D-E | 637 | 683 | 10 |
| D-E-F-G | 642 | 688 | 20 |
| E-F-G | 644.5 | 690.5 | 15 |
| F-G | 647 | 683 | 10 |

Each mSBS 255 is a set of spectrum blocks to be supported by a single deployed sector antenna. Some mSBSs 255 correspond only to a single one of the spectrum blocks licensed to the greenfield network operator in the associated mLGR 245. For example, each of the first seven mSBSs 255 listed in the Table represents a respective single 5 MHz block of full-duplex spectrum (5 MHz of downlink spectrum and 5 MHz of uplink spectrum) evenly spaced across the full spectrum range of the n71 band. Other mSBSs 255 correspond to a continuous group (subset) of the spectrum blocks licensed to the greenfield network operator in the associated mLGR 245. Typically, all sector antennas are implemented as multiband antennas, and filters and/or other components are used to limit each deployed sector antenna to radiate in a particular mSBS 255 (i.e., in a single spectrum block, or a contiguous group of spectrum blocks). For example, the mSBS 255 identified as "A-B" represents an instance where both the "A" and "B" mSBSs 255 are licensed to the greenfield network operator in the same mLGR 245, such that a single sector antenna in a physical location within that mLGR 245 can transmit over the entire 10 MHz bandwidth covered by both the "A" and "B" mSBSs 255. The single sector antenna typically treats the contiguous group of "A" and "B" spectrum blocks as a single, combined, 10 MHz "AB" spectrum block. As another example, the mSBS 255 identified as "D-E-F-G" represents an instance where all of the "D", "E", "F", and "G" mSBSs 255 are licensed to the greenfield network operator in the same mLGR 245, such that a single sector antenna in a physical location within that mLGR 245 can transmit over the entire 20 MHz bandwidth covered by all four of the "D", "E", "F", and "G" mSBSs 255. It can be seen that the various mSBSs 255 listed in the Table are all either a single spectrum block or a contiguous group of spectrum blocks.

Typically, a single mSBS 255 does not include a non-contiguous set of the spectrum blocks licensed to the greenfield network operator in the associated mLGR 245, and it is generally assumed that intermediary frequencies (i.e., between the non-contiguous bands) are licensed to another operator. For example, if a particular greenfield network operator has licenses to the "A" and "C" mSBSs 255 in a particular mLGR 245, it can be assumed that another operator has a license to use the "B" mSBS 255 in that same mLGR 245 (or that there is some other reason why the greenfield network operator is not authorized to communicate on the "B" mSBS 255). In such cases, the non-contiguous spectrum blocks are considered as separate mSBSs 255, and the greenfield network operator can deploy a separate sector antenna for each mSBS 255. For example, if the greenfield network operator is granted licenses in a particular mLGR 245 to use spectrum blocks "D", "E", and "G" in a particular mLGR 245, the spectrum mapper 250 can assign two mSBSs 255 to any template site 222 in that mLGR 245: a first mSBS 255 corresponding to the 10 MHz contiguous "D-E" frequencies; and a second mSBS 255 corresponding to the 5 MHz "G" frequencies.

Notably, the Table above only shows some of the possible mSBSs 255 for a single 5G NR band. In a large-scale greenfield network deployment, the same greenfield network operator may be granted licenses for spectrum blocks in multiple such bands. For example, to build out a certain type of 5G NR network, a greenfield network operator may be granted licenses in n29, n66, n70, n71, and/or others. As such, the non-contiguous spectrum blocks licensed to a particular greenfield network operator in a particular mLGR 245 may be from different bands. As such, for a particular template site 222, the spectrum mapper 250 may associate the one or more mSBSs 255 as one or more mSBSs 255 in each of one or more bands.

For further illustration, FIG. 3A shows illustrative mLGRs 245 as bounded by thinner boundary lines 315. For example, each boundary line 315 may also coincide with a U.S. county boundary, or the like. The shading pattern in each mLGR 245 represents the set of mSBSs 255 for that mLGR 245 (i.e., all mLGRs 245 with the same shading are also associated with the same set of mSBSs 255). For example, mLGR 245a and a number of other adjacent mLGRs 245 are shaded according to a first shading pattern, corresponding to a first one or more mSBSs 255 (e.g., n71 spectrum block "A"); mLGR 245b and a number of other adjacent mLGRs 245 are shaded according to a second shading pattern, corresponding to a second one or more mSBSs 255 (e.g., n71 spectrum block "FG"); mLGR 245c and a number of other adjacent mLGRs 245 are shaded according to a third shading pattern, corresponding to a third one or more mSBSs 255 (e.g., n71 spectrum block "F" and two spectrum blocks from n66); and mLGR 245d and a number of other adjacent mLGRs 245 are shaded according to a fourth shading pattern, corresponding to a fourth one or more mSBSs 255 (e.g., n71 spectrum block "G", one spectrum block from n66, and two spectrum blocks from n29).

Returning to FIG. 2, embodiments of the sector generator compute a sector deployment 265 for each mSBS 255 at each template deployment 220 (i.e., at each template site 222). Each computed sector deployment 265 defines a set of sector antennas 269 for installation at a sector site 267 corresponding to the template site 222 defined by the template deployment 220. Each of the set of sector antennas 269 is configured to operate in accordance with the mSBS 255 and with antenna characteristics of the template antennas 224 defined by the template deployment 220. In some embodiments, each computed sector antenna 269 corresponds to one of the template antennas 224 and can be automatically populated with antenna characteristics, accordingly. For example, each sector antenna 269 can inherit characteristics, such as antenna model, height, azimuth, downtilt, transmit power, etc. from its corresponding template antenna 224.

As used herein, the "sector antennas 269" computed as part of the computed sector deployments 265 are logical representations of proposed physical sector antennas. From the perspective of the sector generator 260, each sector antenna 269 can be identified by a cell identifier (or any suitable logical identifier), and the cell identifier is logically associated in any suitable manner with antenna characteristics data. In one implementation, each sector generator 260 is stored as an object identified by the cell identifier, and the antenna characteristics are stored as object data, metadata, or the like. In another implementation, the cell identifiers and antenna characteristics are stored in a relational database, or otherwise as structured data.

The sector site 267 of each sector deployment 265 is necessarily within a single mLGR 245 and is generated according the one or more mSBSs 255 for that mLGR 245. Each sector deployment 265 is generated for a single mSBS 255. As such, for any template site 222 located in a mLGR 245 that has multiple mSBSs 255, the sector generator 260 will generate a unique sector deployment 265 at the same corresponding sector site 267 for each mSBS 255 in that mLGR 245. For example, if a particular template site 222 is located in a mLGR 245 that has four mSBSs 255 (e.g., corresponding to four non-contiguous sets of spectrum blocks), the sector generator 260 will generate four separate sector deployments 265; each having a respective set of sector antennas 269 located at the same sector site 267, but configured with antenna characteristics associated with the particular spectrum blocks of its respective one of the four mSBSs 255.

In some embodiments, each sector deployment 265 automatically generates the set of sector antennas 269 as a set of three sector antennas 269, such as illustrated in FIG. 1B. For the set of three sector antennas 269, all three sector antennas 269 are at the same sector site 267 at a same antenna height, and each has a different respective antenna azimuth. As described above, the respective antenna azimuths can be approximately 120 degrees apart, such that there is maximum directional separation between the beams. For any template site 222 located in a mLGR 245 that has multiple mSBSs 255, such embodiments of the sector generator 260 will generate a unique sector deployment 265 of three dedicated sector antennas 269 at the same corresponding sector site 267 for each mSBS 255 in that mLGR 245. For example, each set of three sector antennas 269 can be assigned to its own respective antenna height on the support structure at the sector site 267.

In some embodiments, the sector generator 260 automatically generates sector deployments 265 for all template sites 222. In other embodiments, the sector generator 260 automatically generates sector deployments 265 for all template sites 222 within a defined target coverage area 320. For example, a target coverage area can be manually drawn on a mapping interface of an application, defined by coordinates, and/or indicated in any other suitable manner. In other embodiments, the sector generator 260 automatically generates sector deployments 265 for all template sites 222 that are selected. For example, each template site 222 can be selected in a graphical mapping interface (e.g., such as illustrated in FIG. 3A), selected from a list of template sites 222, selected by coordinates, and/or selected in any other suitable manner.

As described above, a design output for a deployed physical infrastructure for a radiofrequency (RF) network can include a number of sector antennas 269 to be installed at sector sites 267 to meet a link budget over a target coverage area 320. The design of a physical infrastructure for such an RF network can be an iterative process. For example, such a process may begin by the greenfield network operator obtaining a list of all available sites 216 for a particular target coverage area 320. An initial design phase can input the available sites 216, along with constraint data 212, propagation model data 214, and/or other information into a RF network design system 210 to generate an initial design template. The initial design template can include a set of template antennas 224 at template sites 222 (i.e., corresponding to a subset of the available sites 216) to meet a link budget (and/or other initial RF network design constraints) for the target coverage area 320. For example, the design process may begin with a list of some number available sites 216, and the initial design template may include a selection of some percentage (e.g., 10%, 15%, etc.) of those available sites 216 to use as template sites 222 for template deployments 220 in order to meet the link budget and/or other design constraints.

In a next design phase, embodiments of the automated sector creation system 230 can use the template sites 222 and template antennas 224, along with mapping data 270 relating to geographic spectrum licenses, to compute sector antennas 269 at sector sites 267. As described above, each computed sector antenna 269 has associated antenna characteristics. Each sector antenna 269 is associated with one or more particular transmit frequencies based on the mSBS 255 used to compute the sector antenna 269; each sector antenna 269 is associated with a particular antenna model, antenna height, antenna azimuth, antenna downtilt, transmit power, etc. (e.g., as inherited from its corresponding template antenna 224); and each sector antenna 269 is located at a particular sector site 267 that is associated with a particular mLGR 245 and propagation model data 214.

In some embodiments, in a next RF physical network design phase, embodiments of the automated border coordination system 280 seek to determine whether any of the proposed sector deployments 265 create border conflicts. As noted above, each proposed sector antenna 269 is located at a particular sector site 267, the sector site 267 is located in a particular mLGR 245, and the mLGR 245 is associated with a particular set of mSBSs 255 corresponding to the blocks of spectrum licensed to the greenfield network operator in that location. However, at each boundary of each mLGR 245, there may be change in which blocks of spectrum are licensed to the greenfield network operator.

For example, FIG. 3B shows a zoomed-in region 350 of the geographic context 300 of FIG. 3A (the region 350 is represented by a dashed boundary in FIG. 3A). As illustrated, there are a number of different mLGRs 245 within the target coverage area 320, each having respective defined borders 315. For some mLGRs 245, the mSBSs 255 are the same on either side of the border 315, such as in the case of mLGR 245a1 and mLGR 245a2. For other mLGRs 245, the mSBSs 255 are different on either side of the border 315, such as in the case of mLGR 245a1 and mLGR 245b. As one example, in a particular band (e.g., band n71), the greenfield network operator may have licenses only to spectrum block "A" in mLGR 245a1, and only to spectrum block "B" in mLGR 245b; the greenfield network operator does not have the right to transmit on spectrum block "A" in mLGR 245b and does not have the right to transmit on spectrum block "B" in mLGR 245a1. As another example, in a particular band, the greenfield network operator may have licenses only to spectrum block "A" in mLGR 245a1, and to spectrum blocks "A" and "C" in mLGR 245b; the greenfield network operator has the right to transmit on spectrum block "A" in both mLGR 245a1 and mLGR 245b, but does not have the right to transmit on spectrum block "C" in mLGR 245a1.

Thus, remaining within the licensed spectrum rights can involve ensuring that any particular sector antenna 269 does not radiate energy of a particular spectrum block into mLGRs 245 where the greenfield network operator does not have rights to that spectrum block. Of course, it is impractical to require that propagation of RF radiation from a sector antenna 269 will end sharply at a border 315. Rather, the licensing regimes typically acknowledge that the amount of the radiation from any particular sector antenna 269 will propagate over some distance, continually decreasing until it reaches a negligible level. As such, complying with a spectrum license can typically involve ensuring that, in any mLGR 245 where the greenfield network operator is not licensed to use a particular spectrum block, the amount of radiation in that spectrum block coming from any of its sector antennas 269 (in mLGRs 245 where it is licensed to use that spectrum block) has dropped to a low enough level so as not to interfere meaningfully with other RF signals in the mLGR 245.

For example, FIG. 3B shows an example sector deployment 265*a* (corresponding to one or more sector antennas 269 deployed at the same sector site 267 and height) in a location close to a border 315 between mLGR 245*a*1 and mLGR 245*b*. For the sake of illustration, it can be assumed that sector deployment 265*a* is proposed to transmit on spectrum block "A", and the greenfield network operator does not have a license to use spectrum block "A" in mLGR 245*b*. As such, the greenfield network operator may be required as part of the license grant for spectrum block "A" to demonstrate that the level of spectrum block "A" radiation from sector deployment 265*a* is below a threshold level in all locations within mLGR 245*b* (e.g., even just across the border 315).

The amount of RF radiation reaching any particular location can be expressed as a power flux density, which essentially indicates a magnitude of particular RF radiation (e.g., from a particular sector antenna 269 at a particular frequency) that is passing through the location per unit time. For example, the power flux density can be expressed in terms of decibel-microvolts per meter, dBµV/m; decibels times Watts per square meter, $dB(W/m^2)$; or in any other suitable manner. Each spectrum licenses granted to the greenfield network operator can typically include (or reference) threshold levels of power flux density (or another desired threshold level) at particular border conditions. For example, a FCC licensing scheme for a 600 MHz band may reference a threshold power flux density level of 40 dBµV/m. Complying with such a license in the 600 MHz band may involve the greenfield network operator being able to demonstrate (e.g., with simulations prior to deployment, with actual measurements after deployment, etc.) that the power flux density is below 40 dBµV/m at each geographic boundary of the license. In some cases, such threshold levels are also defined for additional considerations. In some such cases, regulatory agencies, or other bodies can establish "quiet zones" in geographic regions to protect operations from interference caused by the deployed RF network, and RF radiation in certain bands may be restricted in those quiet zones. For example, a quiet zone can be defined by a border some distance around a radio astronomy research center. Border constraints, such as threshold power flux density levels for different spectrum blocks, other border threshold levels, quiet zone levels, and/or other similar information can be detailed in any suitable manner and in any suitable location that is accessible to the automated border coordination system 280. In the illustrated embodiment, it is assumed that the border constraints are stored as part of the constraint data 212. In other embodiments, additionally or alternatively, the border constraints can be stored as part of the mapping data 270.

As illustrated, embodiments of the automated border coordination system 280 include a radiation contour mapper 285 and a border conflict detector 290. The radiation contour mapper 285 computes a radiation contour for one or more sector antennas 269 based on associated data generated by the sector generator 260 and propagation model data 214. As described above, each sector antenna 269 is defined by antenna characteristics, and those antenna characteristics can impact the manner in which the sector antenna 269 radiates RF energy. For example, as described with reference to FIG. 1B, radiation from a sector antenna 269 can generally radiate in accordance with a primary radiating axis. The axis can be considered as a vector originating based on the location of the sector site 267 and the antenna height, and pointing in a direction based on the sector antenna's 269 azimuth, downtilt, etc. The specific type of sector antenna 269, including its particular types and arrangements of components, also cause the sector antenna 269 to produce a particular characteristic radiation pattern, such as a forming a radiation beam that generally fans out horizontally to either side of the primary radiating axis, while remaining relatively narrow in the vertical direction. Characteristics of the radiation pattern generated by any particular sector antenna 269 can be further based on the particular frequency (e.g., the carrier frequency, frequency range, mSBS 255, etc.) being transmitted and the amount of power used to transmit at that frequency. In some embodiments, each sector antenna 269 is generated by the sector generator 260 to have at least some specific antenna characteristics for each spectrum block (e.g., each mSBS 255) on which it operates. In other embodiments, different spectrum blocks are classified by spectrum band, and each sector antenna 269 is generated by the sector generator 260 to have at least some specific antenna characteristics for each spectrum band in which it operates. In some such embodiments, spectrum bands are classified based on an auctioned band (e.g., all bands associated with 5G 600 MHz NR deployments). In some such embodiments, spectrum bands are classified based on non-license-specific classifications, such as "low-band," mid-band," and "high-band" spectrum blocks.

In some cases, the radiation pattern being generated by any particular sector antenna 269 can also be impacted by surrounding sources of interfering electromagnetic radiation. For example, radiation from adjacent sector antennas 269 at a same sector site 267 (e.g., on a same support structure), and/or other nearby RF radiators, can impact generation of radiation by the sector antenna 269. Based on the above factors, each sector antenna 269 outputs radiation at one or more power levels in one or more frequencies to propagate in multiple directions. The propagation of the radiation is further impacted by various factors, such as those modeled by the propagation model data 214 surrounding the sector site 267. For example, different frequencies of RF radiation can propagate differently in different geographic morphologies, such as in regions of water, wetlands, barren land, low vegetation, different types and densities of forests, different types and densities of construction, commercial centers, industrial centers, airports, etc.

Embodiments of the radiation contour mapper 285 can effectively compute estimated local power measurements (e.g., a measurement of power flux density) at each of a number of geographical measurement points, such as at or near mLGR 245 borders 315 (and/or in other locations within mLGRs 245, around designated quiet zones, etc.). The local power measurements can be geographically plotted to generate a radiation contour map. The radiation contour mapper 285 can automatically generate local power measurements and/or radiation contour maps one, multiple, or all spectrum blocks and for one, multiple, or all sector antennas 269 at a time. In some embodiments, the radiation contour mapper 285 is directed to compute the local power measurements and/or the radiation contour map for a representative frequency (e.g., a center carrier frequency) of a designated spectrum block for a designated sector antenna 269. In some embodiments, the radiation contour mapper 285 is directed to compute the local power measurements and/or the radiation contour map for a representative frequency of a designated spectrum block for all sector antennas 269. In some embodiments, the radiation contour mapper 285 computes the local power measurements and/or the radiation contour map for a representative frequency of a designated spectrum block for a selected group of sector antennas 269. In some such embodiments, the group is based on the sector deployment 265 for a particular sector site 267, such as a group of three sector antennas 269 generated together at a same sector site 267 and antenna height, but pointing at different azimuths. In some such embodiments, the group is manually selected by an operator, such as to run an automated border coordination test for a designated group of sector antennas 269. In other such embodiments, the group is automatically selected by the automated border coordination system 280. For example, the automated border coordination system 280 can automatically select all sector antennas 269 within a predetermined threshold distance from a mLGR 245 border 315. In some embodiments, the radiation contour mapper 285 is directed to compute the local power measurements and/or the radiation contour map for a representative frequency of each of multiple spectrum blocks for each of multiple sector antennas 269. For example, the radiation contour mapper 285 is directed to compute the local power measurements and/or the radiation contour map for a representative frequency of each of one or more classified spectrum bands (e.g., "band n29," "high-band," etc.; each including one or more spectrum blocks) for all sector antennas 269 in the target coverage area 320.

For example, referring to the Table of example spectrum blocks above, spectrum block "F" is a 5 MHz sub-band of downlink frequencies ranging from 642 MHz-647 MHz around a center carrier frequency of 644.5 MHz. Embodiments of the radiation contour mapper 285 can compute a radiation contour map for one or more sector antennas 269 transmitting on the "F" spectrum block based on location attributes of each sector antenna 269 (e.g., sector site 267, height, azimuth, downtilt, etc.), radiation characteristics of each sector antenna 269 (e.g., transmit power, radiation model, etc.) at 644.5 MHz, and impacts of propagation model data 214 on 644.5 MHz transmissions.

Embodiments of the border conflict detector 290 can analyze the radiation contour map (and/or local power measurements) along with the border constraints to detect whether there are any border conflicts. As used herein, a border conflict is any condition that indicates a potential license violation, or other legal or regulatory violation, that would arise from operation of one or more sector antennas 269 at one or more spectrum blocks as deployed, or as proposed for deployment. For example, if the radiation contour map computed by the radiation contour mapper 285 shows that the power flux density associated with a particular sector antenna 269 operating at a particular spectrum block frequency is above a licensed maximum threshold level for an unlicensed mLGR 245, the border conflict detector 290 can detect a border conflict condition. In response to detecting such a border conflict, embodiments of the border conflict detector 290 output conflict data 292.

In some embodiments, the border conflict detector 290 outputs the conflict data 292 as one or more flags indicating which sector antennas 269 (or groups of sector antennas 269) are detected to have generated border conflicts. In other embodiments, the border conflict detector 290 outputs the conflict data 292 to include additional information about each conflict. For example, the automated border coordination system 280 can run for a large number of sector sites 267 for one or more multiple mSBSs 255 and for one or more mLGRs 245; and the output of the border conflict detector 290 can include conflict data 292 indicating some or all of: which sector antennas 269 generated the border conflict; in which mLGRs 245 the conflict was detected; in which spectrum blocks the conflict was detected; a conflict type associated with the detected conflict (e.g., a conflict against terms of an associated spectrum license, a conflict against a regulation impacting an associated spectrum license, a conflict against a particular network operator, etc.). In other embodiments, the border conflict detector 290 outputs the conflict data 292 to include suggested remediation information. For example, the border conflict detector 290 can determine instances in which a reduction in transmit power of a particular sector antenna 269 would likely remediate the detected conflict, or instances in which a removal of a particular sector antenna 269 would likely remediate the detected conflict.

Figure 4:
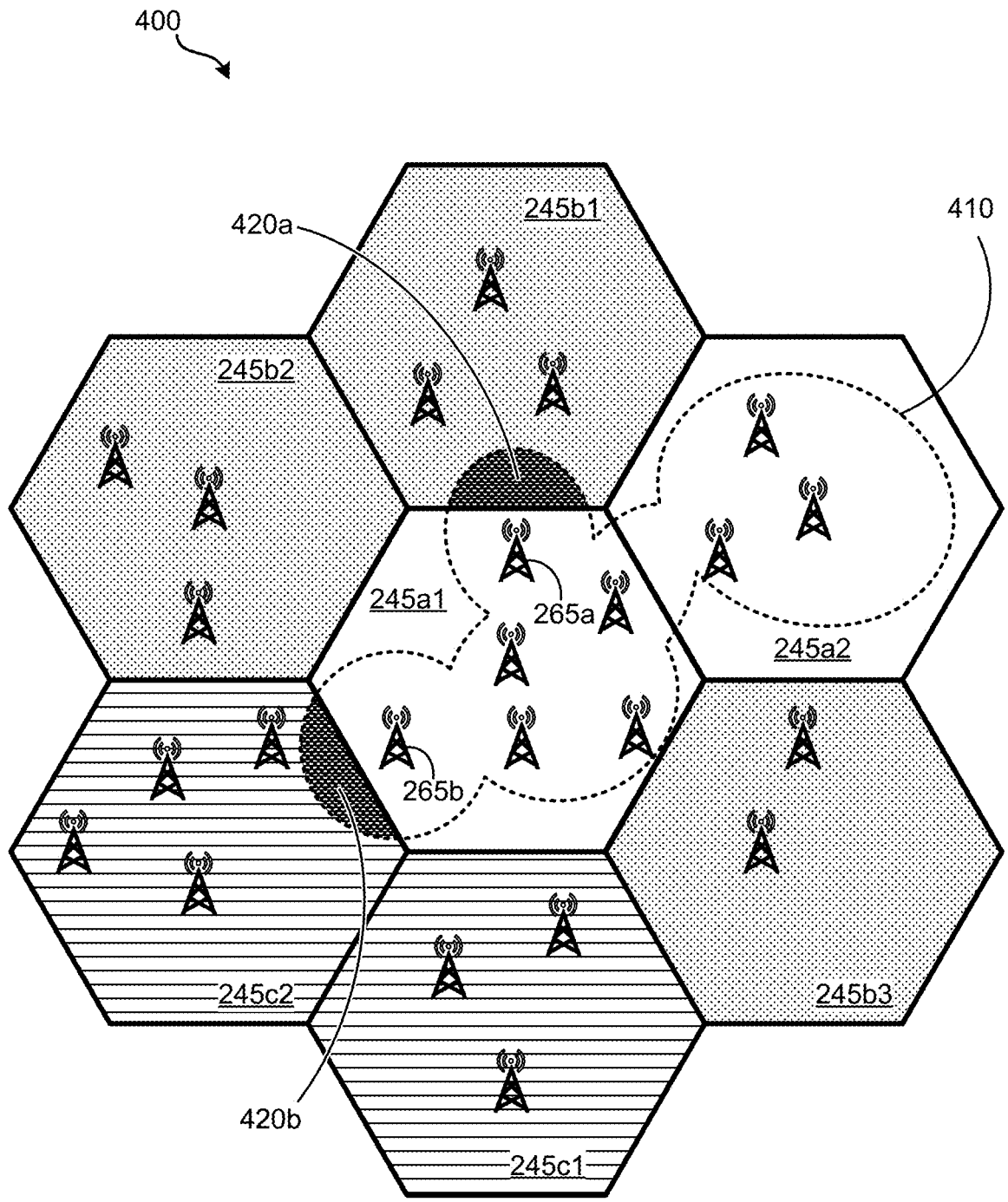
FIG. 4 shows an example geographic context to illustrate automated border coordination, according to various embodiments herein.

For the sake of added clarity, FIG. 4 shows an example geographic context 400 to illustrate automated border coordination, according to various embodiments herein. The geographic context 400 includes a number of mLGRs 245, represented as hexagonal cells. FIG. 4 illustrates an example scenario for a particular spectrum block owned by three different parties in the different mLGRs 245 of the geographic context 400, as indicated by different shading patterns. In particular, greenfield network operator ("Company A") has been granted licenses for the spectrum block in mLGR 245$a1$ and mLGR 245$a2$; another network operator ("Company B") has been granted licenses for the spectrum block in mLGR 245$b1$, mLGR 245$b2$, and mLGR 245$b3$; and another network operator ("Company C") has been granted licenses for the spectrum block in mLGR 245$c1$ and mLGR 245$c2$.

As illustrated, Company A completed an initial RF design, including using the automated sector creation system 230 to generate a number of proposed sector deployments 265, each at a corresponding sector site 267 within mLGR 245$a1$ and mLGR 245$a2$. The proposed sector deployments 265 are input to the automated border coordination system 280 to determine whether there are any border conflicts. In some embodiments, the radiation contour mapper 285 generates the radiation contour map as a series of individual local power measurement data points mapped to geographical measurement locations. In some such embodiments, the computed values can be normalized (e.g., to a predefined scale) prior to output. In other embodiments, the radiation contour mapper 285 generates the radiation contour map as a series of individual conflict scores mapped to geographical measurement locations. For example, instead of outputting the computed power flux density value for a geographical measurement location, a conflict scores can be output to indicate whether the computed local power measurement exceeded a threshold value (e.g., a binary determination of "conflict" or "no conflict", or the like), to indicate a likelihood of a border conflict (e.g., based on a statistical confidence measurement, proximity to a border, magnitude of difference between the computed value and a threshold, etc.), etc. In embodiments that output individual data points (e.g., whether computed values, scores, etc.), the output can include additional graphical, or other indication of a border conflict. For example, an embodiment can output computed local power measurements, and each value can be color-coded according to a score, normalized value, or other information.

In some embodiments, the radiation contour mapper 285 generates the radiation contour map as graphical map. In some such embodiments, the graphical map can include a graphical representation of a geographical region with individual data point values mapped to corresponding geographical measurement locations in the represented region. In other such embodiments, such as illustrated in FIG. 4, the graphical map indicates a plot of a radiation contour boundary 410 mapped to a graphical representation of a geographical region. The radiation contour boundary 410 can indicate the boundary past which local power measurements fall below a licensed (or otherwise regulated) threshold level. For example, if the regulated level for a particular spectrum band is a power flux density of 40 dBμV/m, the radiation contour boundary 410 can define the region within which power flux density measurements are over 40 dBμV/m, and outside of which power flux density measurements are less than or equal to 40 dBμV/m.

In the illustrated scenario of FIG. 4, most of the radiation contour boundary 410 falls within mLGR 245a1 and mLGR 245a2. However, after running the radiation contour boundary 410 through the border conflict detector 290, the border conflict detector 290 has detected at least two border conflicts, illustrated by regions 420a and 420b. In some embodiments, the conflict data 292 output by the border conflict detector 290 can graphically represent the conflict regions, for example, as shown in FIG. 4. In some embodiments, the conflict data 292 output by the border conflict detector 290 can graphically represent which sector deployments 265 and/or sector antennas 269 are involved in detected conflicts. Other embodiments of the border conflict detector 290 can indicate conflict data 292 in any suitable manner.

The conflict data 292 can indicate (directly or indirectly) that sector deployments 265a and 265b are the causes of the detected order conflicts. There may be multiple ways to remedy such conflicts. For example, one or more of the sector antennas 269 at an offending sector site 267 can have its power reduced, and/or one or more of the sector antennas 269 at an offending sector site 267 can be repointed. In such cases, the RF design can de-conflicted by updating antenna characteristics for the one or more sector antennas 269 to reduce the power level, change the pointing (e.g., adjust the downtilt), etc. For example, as shown in FIG. 2, the conflict data 292 can be used to make adjustments to the sector deployments 265. In other cases, one or more of the sector antennas 269 at an offending sector site 267 may have to be removed from the proposed RF network design to remedy border conflicts. In such cases, the RF design may no longer meet the link budget across the target coverage area 310 after removing the one or more offending sector antennas 269. As such, as shown in FIG. 2, the conflict data 292 may be fed back to the RF network design system 210 for use in identifying one or more replacement sites.

For example, as described above, the RF design for the physical network infrastructure can include multiple stages and can be iterative. The RF network design system 210 can generate an initial design template, from which the automated sector creation system 230 can compute proposed sector deployments 265. However, the greenfield network operator may not be able to deploy the physical network infrastructure as proposed. One reason is that some of the available sites 216 used in the initial RF design may not actually be available. For example, a particular site may become unavailable during the design phase, an owner of the particular site may decide not to lease out the site for some reason, etc. Another reason some of the proposed sector deployments 265 may not be used is because of conflicts detected by the automated border coordination system 280. Regardless of the reason, certain of the initial available sites 216 (which became template sites 222 and then sector sites 267 during the previous design iteration) cannot be used to meet link budgets and/or other design constraints. There may be a single replacement site (e.g., one or more unused available sites 216, or a newly available site since the previous iteration) to which a previously generated, offending sector deployment 265 can be moved, such that deploying the sector deployment 265 in the replacement site still meets design constraints without causing the border conflict. In some cases, replacing a removed offending sector deployment 265 may involve identifying multiple replacement sites and generating multiple replacement sector deployments 265. During this iterative process, additional changes can occur that can further impact a proposed RF design. The above and other considerations (e.g., changing license regimes, changing regulations, etc.) can create a dynamic context around designing and deploying physical network infrastructure by a greenfield network operator.

Figure 5:
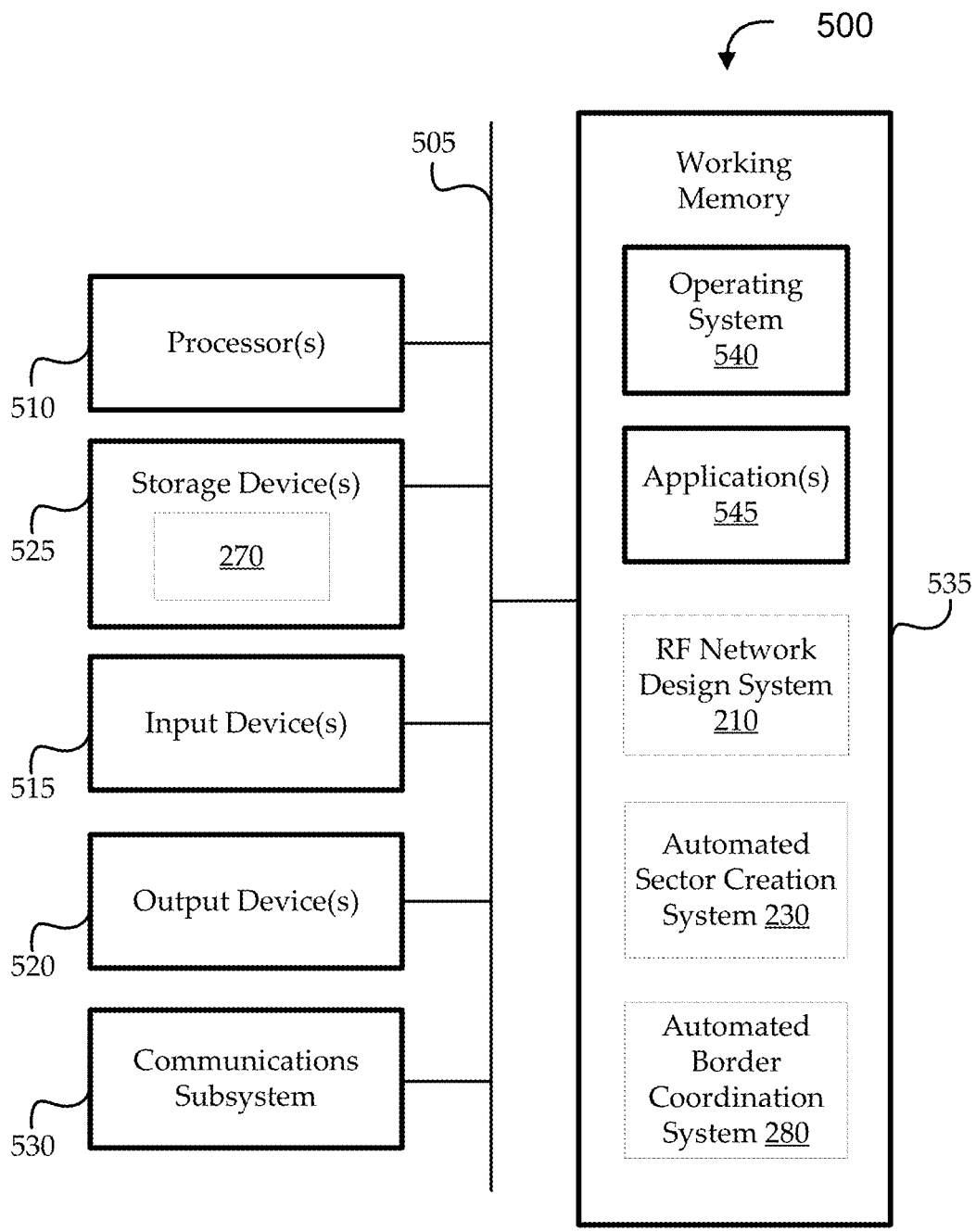
FIG. 5 provides a schematic illustration of one embodiment of a computer system that can implement various system components and/or perform various steps of methods provided by various embodiments.

In some embodiments, components of some or all of the automated sector creation system 230, the automated border coordination system 280, and the RF network design system 210 can be implemented in a computational environment. FIG. 5 provides a schematic illustration of one embodiment of a computer system 500 that can implement various system components and/or perform various steps of methods provided by various embodiments. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown including hardware elements that can be electrically coupled via a bus 505 (or may otherwise be in communication, as appropriate). The hardware elements may include one or more processors 510, including, without limitation, one or more general-purpose processors and/or one or more special-purpose processors (such as digital signal processing chips, graphics acceleration processors, video decoders, and/or the like); one or more input devices 515, which can include, without limitation, a mouse, a keyboard, remote control, touchscreen interfaces, audio interfaces, video interfaces, and/or the like; and one or more output devices 520, which can include, without limitation, display devices, printers, and/or the like.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like. In some embodiments, the storage devices 525 include memory for storing the mapping data 270, constraint data 212 (e.g., including border constraint data), propagation model data 214, available site 216 data, sector deployment 265 data (e.g., antenna characteristics), conflict data 292, and/or other data used by embodiments. The computer system 500 can also include a communications subsystem 530, which can include, without limitation, a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like.

In many embodiments, the computer system 500 will further include a working memory 535, which can include a RAM or ROM device, as described herein. The computer system 500 also can include software elements, shown as currently being located within the working memory 535, including an operating system 540, device drivers, executable libraries, and/or other code, such as one or more application programs 545, which may include computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general purpose computer (or other device) to perform one or more operations in accordance with the described methods. In some embodiments, the operating system 540 and the working memory 535 are used in conjunction with the one or more processors 510 to implement some or all of the automated sector creation system 230 and the automated border coordination system 280. For example, the operating system 540 and the working memory 535 are used in conjunction with the one or more processors 510 to implement some or all of the location mapper 240, the spectrum mapper 250, the sector generator 260, the radiation contour mapper 285, and the border conflict detector 290.

A set of these instructions and/or codes can be stored on a non-transitory (or non-transient) computer-readable storage medium, such as the non-transitory storage device(s) 525 described above. In some cases, the storage medium can be incorporated within a computer system, such as computer system 500. In other embodiments, the storage medium can be separate from a computer system (e.g., a removable medium, such as a compact disc), and/or provided in an installation package, such that the storage medium can be used to program, configure, and/or adapt a general purpose computer with the instructions/code stored thereon. These instructions can take the form of executable code, which is executable by the computer system 500 and/or can take the form of source and/or installable code, which, upon compilation and/or installation on the computer system 500 (e.g., using any of a variety of generally available compilers, installation programs, compression/decompression utilities, etc.), then takes the form of executable code.

In some embodiments, the computational system 500 implements a system for automated sector creation, as described herein. The non-transitory storage device(s) 525 can have instructions stored thereon, which, when executed, cause the processor(s) 510 to obtain, for each of multiple sector antennas geographically distributed across mLGRs of a physical RF network infrastructure, a respective sector site defining a location in a respective home mLGR of the mLGRs, and respective antenna characteristics defining at least radiation characteristics of the sector antenna, each sector antenna permitted to radiate in a respective one of multiple spectrum blocks in the respective home mLGR pursuant to a granted spectrum license. The instructions can further cause the processor(s) 510 to compute radiation contours for at least a portion of the sector antennas to indicate estimated local power levels (e.g., power flux density measurements) at measurement points based on the respective antenna characteristics and propagation model data defining geographic morphologies for the plurality of mLGRs; to analyze the radiation contours to detect border conflict conditions for any of the measurement points at which the estimated local power levels exceed a threshold radiation level permitted to propagate from the plurality of sector antennas into unlicensed mLGRs pursuant to border constraint data associated with the granted spectrum license; and to output, responsive to detecting the border conflict conditions, a culprit set of the sector antennas as those of the sector antennas responsible for the border conflict conditions. In some embodiments, the output devices 520 implement a display interface to couple with a display device, such as a computer monitor, or other suitable display. In such embodiments, the outputting of the culprit set of the sector antennas is for display via the display interface by generating a graphical map of the plurality of sector antennas with the culprit set of the sector antennas graphically indicated.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computer system 500) to perform methods in accordance with various embodiments of the invention. According to a set of embodiments, some or all of the procedures of such methods are performed by the computer system 500 in response to processor 510 executing one or more sequences of one or more instructions (which can be incorporated into the operating system 540 and/or other code, such as an application program 545) contained in the working memory 535. Such instructions may be read into the working memory 535 from another computer-readable medium, such as one or more of the non-transitory storage device(s) 525. Merely by way of example, execution of the sequences of instructions contained in the working memory 535 can cause the processor(s) 510 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 500, various computer-readable media can be involved in providing instructions/code to processor(s) 510 for execution and/or can be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 525. Volatile media include, without limitation, dynamic memory, such as the working memory 535. Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 510 for execution. Merely by way of example, the instructions may initially be carried on a disk of a remote computer. The remote computer can load the instructions into its dynamic memory and send the instructions as signals over a transmission medium to be received and/or executed by the computer system 500. The communications subsystem 530 (and/or components thereof) generally will receive signals, and the bus 505 then can carry the signals (and/or the data, instructions, etc., carried by the signals) to the working memory 535, from which the processor(s) 510 retrieves and executes the instructions. The instructions received by the working memory 535 may optionally be stored on a non-transitory storage device 525 either before or after execution by the processor(s) 510.

Figure 6:
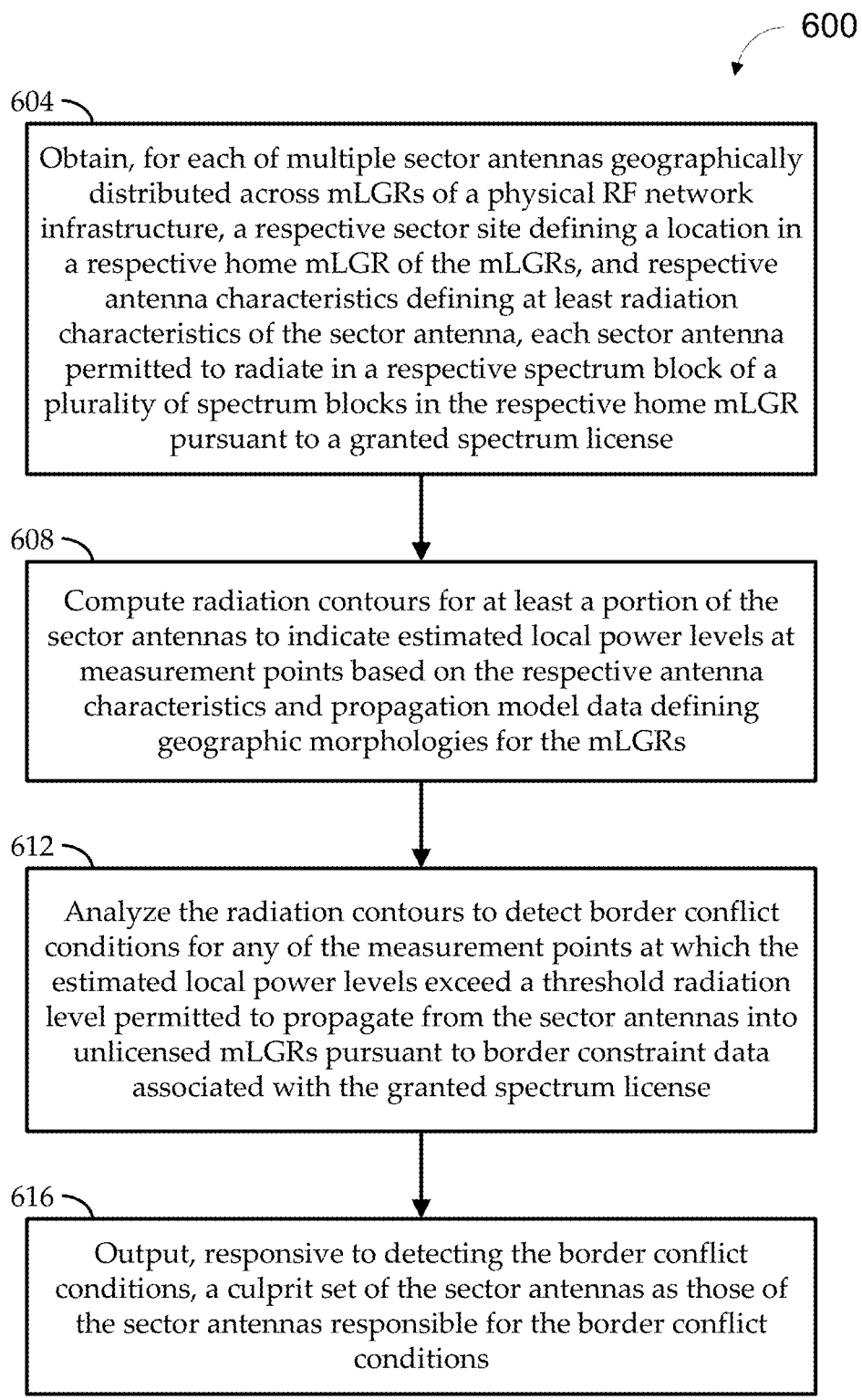
FIG. 6 shows a flow diagram of an illustrative method for automatically detecting border conflicts in physical radiofrequency (RF) network infrastructure deployments, according to various embodiments.

Systems including those described above can be used to implement various methods. FIG. 6 shows a flow diagram of an illustrative method 600 for automatically detecting border conflicts in physical radiofrequency (RF) network infrastructure deployments, according to various embodiments described herein. Embodiments of the method 600 can begin at stage 604 by obtaining, for each sector antenna of multiple sector antennas geographically distributed across a plurality of mapped licensed geographic regions (mLGRs) of a physical RF network infrastructure, a respective sector site defining a location in a respective home mLGR of the mLGRs, and respective antenna characteristics defining at least radiation characteristics of the sector antenna. As described above, the antenna characteristics defining at least radiation characteristics of the sector antenna can include one or more antenna models (e.g., defining horizontal and vertical radiation patterns), radiating power, antenna pointing characteristics (e.g., height, azimuth, downtilt, etc.), etc. Some embodiments implement stage 604 using the radiation contour mapper 285 of the automated border coordination system 280.

As described above, each sector antenna is permitted to radiate in a respective spectrum block of multiple spectrum blocks in its respective home mLGR pursuant to a granted spectrum license. As used herein, the "home mLGR" is the mLGR in which the sector site is located. For example, a greenfield network operator is granted a number of spectrum licenses, each permitting the operator to use a designated one or more spectrum blocks in a designated one or more mLGRs (e.g., corresponding to one or more geographic licensing schemes, or the like). As illustrated by FIG. 4, for any particular spectrum block, some of the mLGRs may be considered as "licensed mLGRs" pursuant to the licenses, such that a sector antenna deployed by the greenfield network operator in any of those licensed mLGRs is permitted to radiate in that spectrum block; and others of the mLGRs may be considered as "unlicensed mLGRs" pursuant to the licenses, such that a sector antenna deployed by the greenfield network operator in any of those unlicensed mLGRs is not permitted to radiate in that spectrum block. It can be assumed that for any deployed (or planned) sector antenna associated with a particular sector site in a home mLGR, the home mLGR is a licensed mLGR with respect to whatever spectrum block the sector antenna is configured to radiate. In some instances, that sector antenna may be located near a border of its home mLGR, such that some of its radiated power crosses the border into an adjacent mLGR. If the adjacent mLGR is also a licensed mLGR with respect to the same spectrum block (i.e., the greenfield network operator also has a license to use the same spectrum block in the adjacent mLGR), there may be no concern. However, if the adjacent mLGR is an unlicensed mLGR with respect to the same spectrum block (i.e., the greenfield network operator does not have a license to use the same spectrum block in the adjacent mLGR), power radiated into the adjacent mLGR in that same spectrum block may be considered a violation of the spectrum license granted to the greenfield network operator. Embodiments of the method 600 can seek automatically to detect such border conflict conditions in which the amount of power radiated into an adjacent unlicensed mLGR exceeds a licensed threshold level.

At stage 608, embodiments of the method 600 can compute radiation contours for at least a portion of the sector antennas to indicate estimated local power levels (e.g., one or more computed power flux density measurements) at multiple measurement points based on the respective antenna characteristics and propagation model data. As described above, the propagation model data can define geographic morphologies for the mLGRs. In some embodiments, different portions of the sector antennas are configured to radiate in different spectrum blocks, and computing the radiation contours at stage 608 involves computing a separate radiation contour for each portion of the sector antennas with respect to its respective spectrum block. For example, a first radiation contour is computed for a first subset of sector antennas configured to radiate in a first spectrum block based on the respective antenna characteristics of the first subset of the sector antennas and the propagation model data, and a second radiation contour is computed for a second subset of sector antennas configured to radiate in a second spectrum block based on the respective antenna characteristics of the second subset of the sector antennas and the propagation model data. In some such embodiments, different spectrum blocks are associated with different propagation model data, and each contour map is computed based on the appropriate propagation model data for the associated spectrum block. For example, each spectrum block can be characterized according to a set of pre-characterized spectrum bands (e.g., license-defined bands, such as "5G NR n71 band"; non-licensed-defined bands, such as "low-band"; etc.), and each pre-characterized spectrum band is associated with a respective propagation model.

At stage 612, embodiments can analyze the radiation contours to detect border conflict conditions. A border conflict condition can be detected for any of the measurement points at which the estimated local power levels exceed a threshold radiation level permitted to propagate from the plurality of sector antennas into unlicensed mLGRs of the plurality of mLGRs pursuant to border constraint data associated with the granted spectrum license. Some embodiments can implement stage 612 using the border conflict detector 290 of the automated border coordination system 280, as described above.

At stage 616, embodiments can output (responsive to detecting the border conflict conditions at stage 612) a culprit set of the sector antennas as those of the sector antennas responsible for the border conflict conditions. As described herein, each sector site can be associated with a three-sector antenna set having a respective first sector antenna pointing at a 0-degree azimuth, a respective second sector antenna pointing at a 120-degree azimuth, and a respective third sector antenna pointing at a 240-degree azimuth. As such, in some embodiments, the culprit set of the sector antennas is output by sector site, such that each member of the culprit set is a respective three-sector antenna set of a respective sector site. For example, rather than indicating a particular single sector antenna as causing a border conflict condition, such embodiments can indicate the sector site.

As described above, the outputting at stage 616 can be performed in a number of different ways, according to different embodiments. In some embodiments, the culprit set of the sector antennas is output for display on a graphical display interface by generating a graphical map of the plurality of sector antennas with the culprit set of the sector antennas graphically indicated. For example, a graphical map, such as the one illustrated in FIG. 3A or 3B, can be generated to represent geographical locations of sector antennas (or sector sites) mapped to a geographical region. On such a graphical map, those sector antennas (or sector sites) determined to be part of the culprit set can be highlighted, shown in a different color, labeled, etc. Additionally or alternatively, navigation controls can be provided to show only those sector antennas (or sector sites) determined to be part of the culprit set (e.g., to hide all other sector antennas or sector sites), to zoom in or out on particular regions, etc.

In some embodiments, a radiation contour map is generated (e.g., at part of stage 608) by geographically plotting the estimated local power levels at the measurement points in relation to geographically plotting the mLGRs. In some such embodiments, the outputting at stage 616 can include generating a graphical representation of the border conflict conditions mapped onto the radiation contour map. For example, as illustrated in FIG. 4, a radiation contour map (e.g., represented as a line within which the local power measurements are above a particular threshold level) can be mapped onto mLGRs, and portions of the radiation contour map crossing into unlicensed mLGRs can be highlighted, differently colored, labeled, or otherwise indicated.

In some embodiments, the outputting at stage 616 indicates each detected border conflict condition and/or each of the culprit set of the sector antennas in a binary manner (e.g., effectively indicating "violation" or "no violation"). In other embodiments, the outputting at stage 616 can indicate additional information, such as a type of violation (e.g., whether the detected border conflict condition is a violation of a granted spectrum license term, a regulatory violation, a violation of a local quiet zone, etc.), or a magnitude of violation. A magnitude of violation can indicate by how much a particular local power measurement exceeds a particular threshold level, a normalized numerical score value, one of a set of predefined violation levels (e.g., "major violation," "minor violation," etc.), and/or any other indication. For example, in a graphical output, each detected border conflict condition and/or each of the culprit set of the sector antennas can be color-coded, labeled, etc. to graphically indicate the magnitude of violation. Such an indication can suggest a possible remedial action. For example, a detected border conflict condition representing only a minor violation (e.g., power flux density measurements only slightly exceeding acceptable levels and only near the border) may be easily addressed by repointing one or more sector antennas (e.g., by adjusting the downtilt); a detected border conflict condition representing a major violation (e.g., power flux density measurements appreciably exceeding acceptable levels and/or in areas extending well beyond the home mLGR border) may only be addressed by removing one or more sector antennas (e.g., and finding one or more replacement sites).

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system to automatically detect border conflicts in physical radiofrequency (RF) network infrastructure deployments, the system comprising:

a radiation contour mapper to:

obtain, for each sector antenna of a plurality of sector antennas geographically distributed across a plurality of mapped licensed geographic regions (mLGRs) of a physical RF network infrastructure, a respective sector site defining a location in a respective home mLGR of the mLGRs, and respective antenna characteristics defining at least radiation characteristics of the sector antenna, each sector antenna permitted to radiate in a respective spectrum block of a plurality of spectrum blocks in the respective home mLGR pursuant to a granted spectrum license;

compute radiation contours for at least a portion of the sector antennas to indicate estimated local power levels at a plurality of measurement points based on the respective antenna characteristics and propagation model data defining geographic morphologies for the plurality of mLGRs; and a border conflict detector in communication with the radiation contour mapper to:
analyze the radiation contours to detect border conflict conditions for any of the measurement points at which the estimated local power levels exceed a threshold radiation level permitted to propagate from the plurality of sector antennas into unlicensed mLGRs of the plurality of mLGRs pursuant to border constraint data associated with the granted spectrum license; and
output, responsive to detecting the border conflict conditions, a culprit set of the sector antennas as those of the plurality of sector antennas responsible for the border conflict conditions.

2. The system of claim 1, wherein:
each of a first portion of the sector antennas is configured to radiate in a first spectrum block of the plurality of spectrum blocks;
each of a second portion of the sector antennas is configured to radiate in a second spectrum block of the plurality of spectrum blocks; and
the radiation contour mapper is to compute the radiation contours by:
computing first radiation contours for the first portion of the sector antennas to indicate the estimated local power levels at the plurality of measurement points in the first spectrum block based on the respective antenna characteristics of the first portion of the sector antennas and the propagation model data; and
computing second radiation contours for the second portion of the sector antennas to indicate the estimated local power levels at the plurality of measurement points in the second spectrum block based on the respective antenna characteristics of the second portion of the sector antennas and the propagation model data.

3. The system of claim 2, wherein:
the first spectrum block is in a first pre-characterized spectrum band associated with a first propagation model;
the second spectrum block is in a second pre-characterized spectrum band associated with a second propagation model;
the computing the first radiation contours is based on the first propagation model data; and
the computing the second radiation contours is based on the second propagation model data.

4. The system of claim 1, wherein:
the radiation contour mapper is to compute the estimated local power levels by computing at least one power flux density at each of the plurality of measurement points.

5. The system of claim 1, wherein:
the radiation contour mapper is further to identify a candidate set of the sector antennas as those of the sector antennas for which the location is within a predetermined threshold distance from a border of the respective home mLGR; and
the radiation contour mapper is to compute the radiation contours for the candidate set of the sector antennas.

6. The system of claim 1, wherein:
the border conflict detector is to output the culprit set of the sector antennas for display on graphical display interface by generating a graphical map of the plurality of sector antennas with the culprit set of the sector antennas graphically indicated.

7. The system of claim 1, wherein:
the radiation contour mapper is further to generate a radiation contour map by geographically plotting the estimated local power levels at the plurality of measurement points in relation to geographically plotting the mLGRs.

8. The system of claim 7, wherein:
the border conflict detector is further to output, for display on a graphical display interface, a graphical representation of the border conflict conditions mapped onto the radiation contour map.

9. The system of claim 1, wherein:
each respective sector site is associated with a respective three-sector antenna set having a respective first sector antenna pointing at a 0-degree azimuth, a respective second sector antenna pointing at a 120-degree azimuth, and a respective third sector antenna pointing at a 240-degree azimuth; and
the border conflict detector is to output the culprit set of the sector antennas by sector site, such that each member of the culprit set is a respective three-sector antenna set of a respective sector site.

10. The system of claim 1, wherein:
the border conflict detector is to output the culprit set of the sector antennas to indicate a magnitude of violation associated with each border conflict condition.

11. A method for automatically detecting border conflicts in physical radiofrequency (RF) network infrastructure deployments, the method comprising:
obtaining, for each sector antenna of a plurality of sector antennas geographically distributed across a plurality of mapped licensed geographic regions (mLGRs) of a physical RF network infrastructure, a respective sector site defining a location in a respective home mLGR of the mLGRs, and respective antenna characteristics defining at least radiation characteristics of the sector antenna, each sector antenna permitted to radiate in a respective spectrum block of a plurality of spectrum blocks in the respective home mLGR pursuant to a granted spectrum license;
computing radiation contours for at least a portion of the sector antennas to indicate estimated local power levels at a plurality of measurement points based on the respective antenna characteristics and propagation model data defining geographic morphologies for the plurality of mLGRs;
analyzing the radiation contours to detect border conflict conditions for any of the measurement points at which the estimated local power levels exceed a threshold radiation level permitted to propagate from the plurality of sector antennas into unlicensed mLGRs of the plurality of mLGRs pursuant to border constraint data associated with the granted spectrum license; and
outputting, responsive to detecting the border conflict conditions, a culprit set of the sector antennas as those of the plurality of sector antennas responsible for the border conflict conditions.

12. The method of claim 11, wherein:
each of a first portion of the sector antennas is configured to radiate in a first spectrum block of the plurality of spectrum blocks;
each of a second portion of the sector antennas is configured to radiate in a second spectrum block of the plurality of spectrum blocks; and
the computing the radiation contours comprises:
computing first radiation contours for the first portion of the sector antennas to indicate the estimated local power levels at the plurality of measurement points in the first spectrum block based on the respective antenna characteristics of the first portion of the sector antennas and the propagation model data; and computing second radiation contours for the second portion of the sector antennas to indicate the estimated local power levels at the plurality of measurement points in the second spectrum block based on the respective antenna characteristics of the second portion of the sector antennas and the propagation model data.

13. The method of claim 12, wherein:

the first spectrum block is in a first pre-characterized spectrum band associated with a first propagation model;

the second spectrum block is in a second pre-characterized spectrum band associated with a second propagation model;

the computing the first radiation contours is based on the first propagation model data; and the computing the second radiation contours is based on the second propagation model data.

14. The method of claim 11, wherein:

the computing the estimated local power levels comprises computing at least one power flux density at each of the plurality of measurement points.

15. The method of claim 11, wherein:

the outputting the culprit set of the sector antennas for display on graphical display interface comprises generating a graphical map of the plurality of sector antennas with the culprit set of the sector antennas graphically indicated.

16. The method of claim 11, further comprising:

generating a radiation contour map by geographically plotting the estimated local power levels at the plurality of measurement points in relation to geographically plotting the mLGRs.

17. The method of claim 16, further comprising:

outputting, for display on a graphical display interface, a graphical representation of the border conflict conditions mapped onto the radiation contour map.

18. A system for automatically detecting border conflicts in physical radiofrequency (RF) network infrastructure deployments, the system comprising:

one or more processors;

a non-transient memory having instructions stored thereon, which, when executed, cause the one or more processors to execute steps comprising:

obtaining, for each sector antenna of a plurality of sector antennas geographically distributed across a plurality of mapped licensed geographic regions (mLGRs) of a physical RF network infrastructure, a respective sector site defining a location in a respective home mLGR of the mLGRs, and respective antenna characteristics defining at least radiation characteristics of the sector antenna, each sector antenna permitted to radiate in a respective spectrum block of a plurality of spectrum blocks in the respective home mLGR pursuant to a granted spectrum license;

computing radiation contours for at least a portion of the sector antennas to indicate estimated local power levels at a plurality of measurement points based on the respective antenna characteristics and propagation model data defining geographic morphologies for the plurality of mLGRs;

analyzing the radiation contours to detect border conflict conditions for any of the measurement points at which the estimated local power levels exceed a threshold radiation level permitted to propagate from the plurality of sector antennas into unlicensed mLGRs of the plurality of mLGRs pursuant to border constraint data associated with the granted spectrum license; and outputting, responsive to detecting the border conflict conditions, a culprit set of the sector antennas as those of the plurality of sector antennas responsible for the border conflict conditions.

19. The system of claim 18, wherein:

each of a first portion of the sector antennas is configured to radiate in a first spectrum block of the plurality of spectrum blocks;

each of a second portion of the sector antennas is configured to radiate in a second spectrum block of the plurality of spectrum blocks; and the computing the radiation contours comprises:

computing first radiation contours for the first portion of the sector antennas to indicate the estimated local power levels at the plurality of measurement points in the first spectrum block based on the respective antenna characteristics of the first portion of the sector antennas and the propagation model data; and computing second radiation contours for the second portion of the sector antennas to indicate the estimated local power levels at the plurality of measurement points in the second spectrum block based on the respective antenna characteristics of the second portion of the sector antennas and the propagation model data.

20. The system of claim 18, further comprising:

a display interface to couple with a display device, wherein the outputting the culprit set of the sector antennas is for display via the display interface by generating a graphical map of the plurality of sector antennas with the culprit set of the sector antennas graphically indicated.

* * * * *